United States Patent
Rios et al.

(10) Patent No.: US 11,811,507 B1
(45) Date of Patent: Nov. 7, 2023

(54) ADAPTIVE DIGITAL RADIO FREQUENCY MEMORY FOR COHERENT RESPONSE SYNTHESIS

(71) Applicant: BAE Systems Information and Electronic Systems Integration Inc., Nashua, NH (US)

(72) Inventors: Austin T. Rios, Brookline, NH (US); Marc A. Fisher, Amherst, NH (US); Ryan Harding, Hudson, NH (US); Patrick R. Kane, Manchester, NH (US); Ryan A. Walsh, Portsmouth, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1,012 days.

(21) Appl. No.: 16/436,197

(22) Filed: Jun. 10, 2019

(51) Int. Cl.
*H04K 3/00* (2006.01)
*G01S 7/02* (2006.01)
*G01S 7/38* (2006.01)

(52) U.S. Cl.
CPC ............. *H04K 3/45* (2013.01); *G01S 7/021* (2013.01); *G01S 7/38* (2013.01); *H04K 3/41* (2013.01); *H04K 3/42* (2013.01); *H04K 3/65* (2013.01); *H04K 3/827* (2013.01)

(58) Field of Classification Search
CPC .... H04K 3/45; H04K 3/41; H04K 3/42; H04K 3/65; H04K 3/827; G01S 7/38
See application file for complete search history.

(56) References Cited

U.S. PATENT DOCUMENTS

| | | | | |
|---|---|---|---|---|
| 4,713,662 A * | 12/1987 | Wiegand | ............... | G01S 7/38 342/13 |
| 4,743,905 A * | 5/1988 | Wiegand | ............... | G01S 7/38 342/14 |
| 4,876,546 A * | 10/1989 | Koerner | ............... | G01S 7/38 342/15 |
| 4,891,646 A * | 1/1990 | Wiegand | ............... | G01S 7/38 369/61 |
| 4,928,104 A * | 5/1990 | Schaffer | ............... | G01S 7/38 342/15 |
| 5,003,312 A * | 3/1991 | Madni et al. | ............ | G01S 7/38 327/231 |
| 5,032,839 A * | 7/1991 | Even-Or | ............... | H04K 3/42 365/76 |
| 5,128,679 A * | 7/1992 | Moffat | ............... | G01S 7/36 342/13 |
| 5,469,166 A * | 11/1995 | Regev | ............... | G01S 7/02 342/14 |

(Continued)

*Primary Examiner* — Peter M Bythrow
(74) *Attorney, Agent, or Firm* — Finch & Maloney PLLC; Gary McFaline

(57) ABSTRACT

A programmable radio frequency (RF) memory system includes a receiver designed to receive an RF pulse, a memory, a waveform transform module, and a transmitter. The memory stores a digitized version of the RF pulse. The waveform transform module is designed to determine one or more characteristics of the digitized version of the RF pulse, and based on the determined one or more characteristics, transform the digitized version of the RF pulse into a transformed signal. The transformed signal has at least one characteristic that is different than the one or more characteristics. The transmitter is designed to transmit an analog equivalent of the transformed signal. The analog equivalent of the transformed signal and the received RF pulse are coherent.

23 Claims, 4 Drawing Sheets

(56) References Cited

U.S. PATENT DOCUMENTS

| | | | | |
|---|---|---|---|---|
| 5,680,336 | A * | 10/1997 | Kaiser | G06F 17/17 708/422 |
| 5,892,479 | A * | 4/1999 | Mills et al. | G01S 7/4052 342/170 |
| 6,271,786 | B1 * | 8/2001 | Huff et al. | G01S 13/346 342/16 |
| 6,377,967 | B1 * | 4/2002 | Wiegand | H03H 17/0223 375/295 |
| 6,538,597 | B1 * | 3/2003 | Steudel | H04K 3/228 342/149 |
| 6,624,780 | B1 * | 9/2003 | Fouts et al. | G01S 7/021 342/25 R |
| 6,721,358 | B1 * | 4/2004 | Pace et al. | G01S 7/38 375/229 |
| 7,081,846 | B1 * | 7/2006 | Sparrow et al. | G01S 7/38 342/14 |
| 7,116,242 | B2 * | 10/2006 | Guthrie | H04B 1/202 340/5.71 |
| 7,719,457 | B1 * | 5/2010 | Tindall | G01S 7/38 342/21 |
| 7,792,218 | B2 * | 9/2010 | Durtschi | H04B 1/0021 342/13 |
| 8,330,641 | B2 * | 12/2012 | Ryden et al. | H04K 3/42 342/14 |
| 8,659,453 | B1 * | 2/2014 | Low et al. | H03M 1/0658 341/110 |
| 10,317,176 | B2 * | 6/2019 | Tithecott | F42B 12/365 |
| 10,473,758 | B2 * | 11/2019 | Caldwell et al. | G01S 7/38 |
| 10,879,609 | B1 * | 12/2020 | Judd | H01Q 3/30 |
| 2008/0268806 | A1 * | 10/2008 | Durtschi | H04B 1/0021 455/313 |
| 2009/0097531 | A1 * | 4/2009 | Franceschini et al. | H04K 3/255 375/E1.033 |
| 2011/0001652 | A1 * | 1/2011 | Martino et al. | G01S 7/38 342/14 |
| 2013/0315341 | A1 * | 11/2013 | Couillard et al. | H04K 3/46 375/285 |
| 2015/0349914 | A1 * | 12/2015 | Schulte, Jr. et al. | H04L 27/2627 455/1 |
| 2016/0146580 | A1 * | 5/2016 | Tithecott | F42B 12/365 342/14 |
| 2016/0294502 | A1 * | 10/2016 | Yensen et al. | H04K 3/45 |
| 2017/0293019 | A1 * | 10/2017 | Caldwell et al. | G01S 7/38 |
| 2018/0009525 | A1 * | 1/2018 | Keegan et al. | B64C 3/26 |
| 2019/0033427 | A1 * | 1/2019 | Cornic et al. | F41H 11/02 |
| 2020/0213029 | A1 * | 7/2020 | Lee et al. | H04K 3/65 |
| 2020/0366402 | A1 * | 11/2020 | Dunn | H04K 3/41 |

* cited by examiner

ADAPTIVE DIGITAL RADIO FREQUENCY MEMORY FOR COHERENT RESPONSE SYNTHESIS

GOVERNMENT LICENSE RIGHTS

This invention was made with government support under contract #FA8750-16-C-0150 awarded by the U.S. Air Force. The government has certain rights in the invention.

BACKGROUND

Digital radio frequency memory (DRFM) is commonly employed to intercept signals from a source and transmit the intercepted signal back to the source. Such systems are advantageous when trying to confuse or mislead an enemy by intercepting their radio frequency signals and providing false "response" signals. Current advances in processing capability have uncovered a need for more advanced and adaptive capability from DRFM systems.

BRIEF DESCRIPTION OF THE DRAWINGS

Features and advantages of embodiments of the claimed subject matter will become apparent as the following Detailed Description proceeds, and upon reference to the Drawings, in which:

Although the following Detailed Description will proceed with reference being made to illustrative embodiments, many alternatives, modifications, and variations thereof will be apparent in light of this disclosure.

DETAILED DESCRIPTION

Systems and techniques are disclosed for adapting an incoming signal based on characteristics of the signal itself and the environment to provide a coherent and more robust attack signal. As used herein, the term "attack signal" refers to a signal generated by a DRFM system based on a received signal designed to confuse or mislead the source of the received signal (or another source associated with the source of the received signal.) Some modern DRFM based systems achieve a coherent response signal but are limited to using the same signal that has been received. Work has been done to apply a frequency shift, time delay, and amplitude scalar of these DRFM responses to provide more capability, but the generated technique has still been very limited. Similarly, arbitrary waveform generation (AWG) systems have the flexibility of playing out a variety of more complex signals but this complexity comes at the cost of coherence. These waveforms are often pre-generated prior to a mission which degrades or prevents the coherence with the threat system. If the attack signal lacks coherence with the received signal, the originating source will likely determine that the received attack signal cannot be trusted and will thus be ignored.

According to an embodiment of the present disclosure, a programmable radio frequency (RF) memory system includes a receiver designed to receive an RF pulse, a memory storage, a waveform transform module, and a transmitter. The memory stores a digitized version of the RF pulse. The waveform transform module is designed to determine one or more characteristics of the digitized version of the RF pulse, and based on the determined one or more characteristics, transform the digitized version of the RF pulse into a transformed signal. The transformed signal has at least one characteristic that is different than the one or more characteristics. For example, the transformed signal may include multiple overlapped copies of the digitized version of the RF pulse. The transmitter is designed to transmit an analog equivalent of the transformed signal. The analog equivalent of the transformed signal and the received RF pulse are coherent.

General Overview

Figure 1:
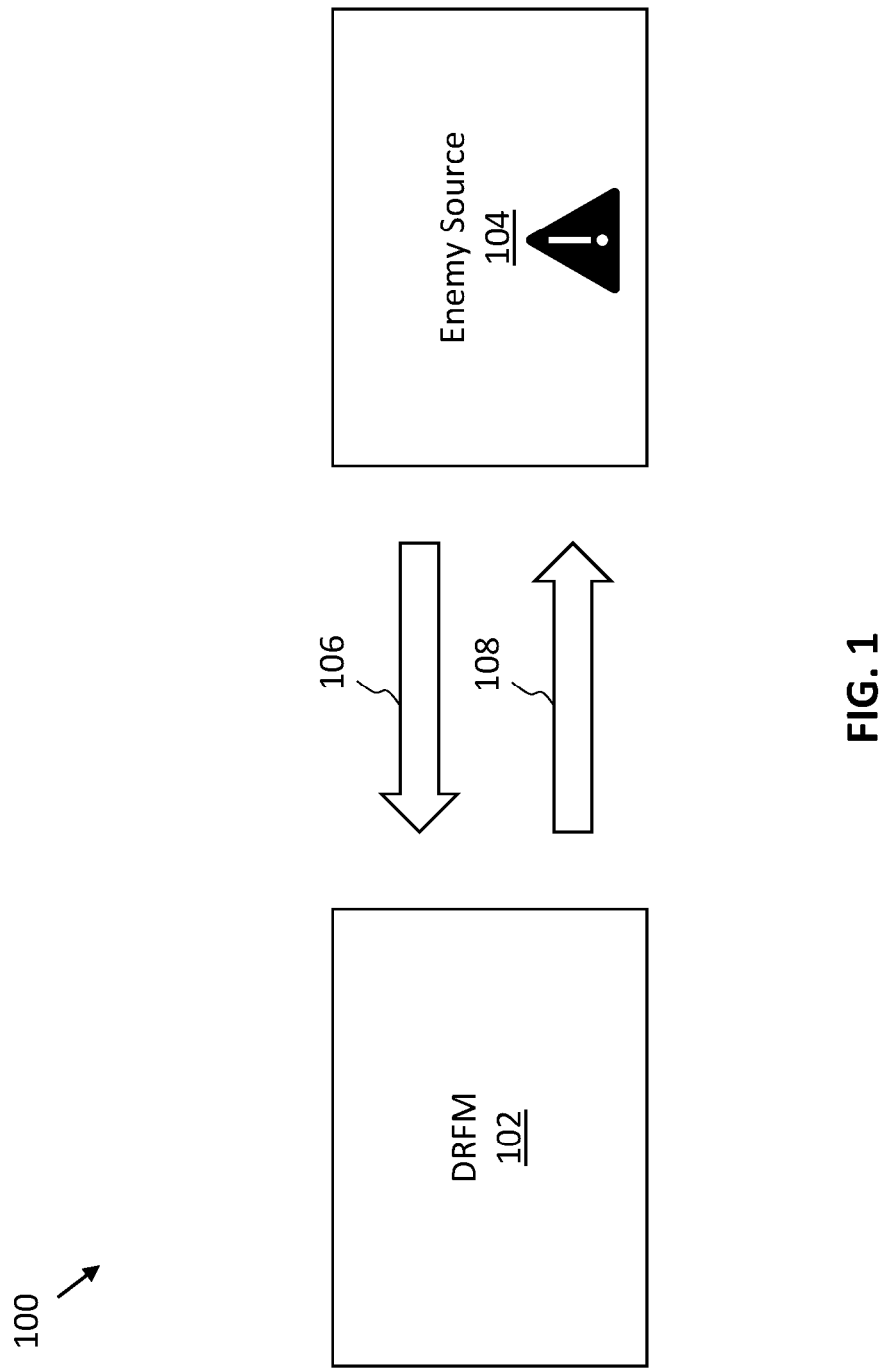
FIG. 1 illustrates a signal transmission environment, in accordance with some embodiments of the present disclosure.

FIG. 1 illustrates an example signal transmission environment 100 having a programmable DRFM 102 and an enemy signal source 104, according to an embodiment. Signal transmission environment 100 may exist anywhere where RF signals can be received.

Enemy signal source 104 represents any type of signaling or communication system that provides one or more RF pulses 106. Examples of enemy signal source 104 can include SONAR systems found on enemy ships or submarines, RADAR systems found on enemy ships, aircraft, or installations, or any navigation, electronic warfare, targeting or communication system that sends and receives RF signals with another entity some distance away. Accordingly, in one example, one or more RF pulses 106 can include important information encoded within the signal, or it may be used by the enemy to probe an area to gather information (such as in the example cases of SONAR or RADAR). As used herein, the term "enemy" includes a broad definition that is not limited to the traditional military construct but includes usage that would be applicable to competitors and other adversaries.

According to some embodiments, DRFM 102 intercepts one or more RF pulses 106, modulates the received signal in some way, and transmits back an attack response signal 108 to be received by enemy signal source 104 (or received by another signal source associated with enemy signal source 104.) An "attack response signal" may be any type of generated signal that has the purpose of interfering with, or jamming, a communication, navigation, or generally any RF-based system (or systems). According to some embodiments, the transmitted attack response signal 108 is modulated in such a way that it maintains coherence with one or more RF pulses 106. The modulation performed by DRFM 102 may be based on one or more characteristics of the received one or more RF pulses 106. In some embodiments, the modulation involves changing the phase of the received one or more RF pulses 106 and stacking multiple waveforms having either the same or different phase between the various stacked waveforms. The transmitted attack response signal 108 may be generated to cause confusion when received by enemy signal source 104, or it may deliberately provide false information to enemy signal source 104. For example, in the case of a RADAR signal, attack response signal 108 may make an enemy signal source 104 believe that a potential target is in a different location than where the actual target is located.

In some embodiments, digital signals are transmitted by enemy signal source 104 and intercepted by DRFM 102 across a network, such as an ethernet network, fiber optic network, or coaxial cable transmission line. Similarly, DRFM 102 may be configured to transmit digital signals back to enemy signal source 104 across a network, such as an ethernet network, fiber optic network, or coaxial cable transmission line.

In some embodiments, a plurality of DRFM systems work in conjunction with one another to intercept one or more RF pulses 106 and generate attack response signal 108. The plurality of DRFM systems may operate in a linked fashion where the operation of one DRFM system informs the operation of another DRFM system and so on. This coordination of DRFM systems can aid in providing multiple instances of false information that can give greater confidence that the false information is accurate.

In some embodiments, attack response signal 108 represents any number of attack signals that are generated in response to the reception of one or more RF pulses 106. Accordingly, in some examples, a single received signal can generate a plurality of attack response signals that are sequenced in a particular fashion. The sequencing of the attack signals may be based on one or more characteristics of the single received signal and/or characteristics associated with the signaling environment.

DRFM Design

Figure 2:
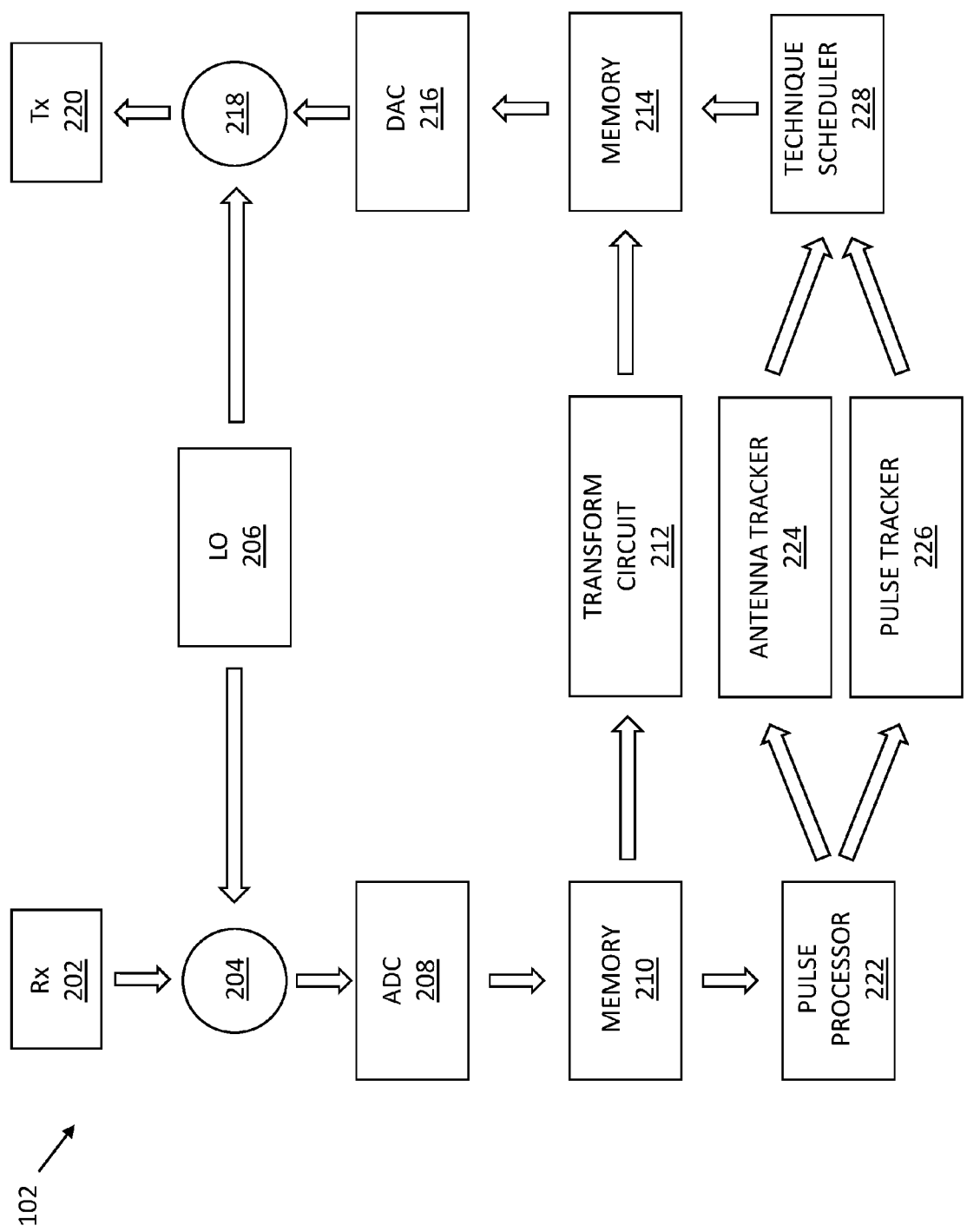
FIG. 2 illustrates an example DRFM system, in accordance with an embodiment of the present disclosure.

FIG. 2 illustrates an example DRFM 102 in more detail, according to some embodiments. Not all illustrated components are required for the operation of DRFM 102, and may be omitted entirely in some embodiments. The arrows are provided to illustrate an example signal transmission from one element to another, but signals may move in other ways between elements in some other embodiments. The various components may be separate components on, for example, a printed circuit board (PCB). In some other embodiments, one or more of the illustrated components is included together in the same chip package on the PCB, or spread across multiple linked PCBs.

DRFM 102 includes a receiver 202. Receiver 202 may include one or more antennas designed to receive an RF signal transmitted by an enemy source. In some embodiments, the one or more antennas of receiver 202 support multiple communication bands (e.g., dual band operation or tri-band operation). For example, some of the antennas may support tri-band operation at 28 gigahertz, 39 gigahertz, and 60 gigahertz. Various ones of the antennas may support tri-band operation at 24.5 gigahertz to 29 gigahertz, 37 gigahertz to 43 gigahertz, and 57 gigahertz to 71 gigahertz. Various ones of the antennas may support 5G communications and 60 gigahertz communications and other broadband communications. Various ones of the antennas may support millimeter wave communications. Various ones of the antennas may support high band frequencies and low band frequencies. In general, various ones of the antennas may support frequencies ranging from HF band frequencies to W band frequencies.

In some embodiments, the received RF signal from receiver 202 (made up of one or more signal pulses) passes to a mixer 204 to be combined with an oscillating signal generated by local oscillator 206. Local oscillator 206 may be any known or standard oscillator component to generate a consistent and stable oscillating frequency that may be used to strip the carrier waveform from the received RF signal. Various other RF preprocessing elements such as amplification and filtering may be employed on the received RF signal and accomplished, for example, by a low noise amplifier and low pass, high pass and/or band pass filters.

In some embodiments, the signal passes from mixer 204 through an analog-to-digital converter (ADC) 208 to generate a digitized version of the received RF signal (herein referred to as a digitized signal.) In one example, the mixer output is an intermediate frequency (IF) but will be referred to as the digitized version of the RF signal herein. ADC 208 may be any standard or known ADC component.

In some embodiments, a memory 210 is provided to store one or more instances of incoming digitized signals. Memory 210 may be any known type of memory such as DDR SDRAM, FLASH, etc. Memory 210 may have a first-in-first-out (FIFO) architecture that queues up incoming signals before passing them on to transform circuit 212 in the order in which they were received. In this way, signals may be modulated by a transform circuit 212 while other later-received signals are stored in memory 210 until they are ready to be processed. In some embodiments, DRFM 102 includes multiple parallel channels each having a transform circuit 212 to provide parallel processing on different received signals simultaneously.

Transform circuit 212 may be implemented in hardware, software, or a combination of both. In some embodiments, transform circuit 212 includes one or more filter elements, phase change elements, frequency shifting elements, and amplitude modulating elements designed to perform a particular modulation to the digitized signal. In some embodiments, transform circuit 212 is implemented as part of an application specific integrated circuit (ASIC) or a field programmable gate array (FPGA). Transform circuit 212 may also represent a coded set of instructions executed by a processor or microcontroller to modulate the digitized signal.

According to some embodiments, transform circuit 212 is configured to determine one or more characteristics about the digitized signal. These characteristics may include one or more of a frequency, phase, length, and amplitude of the digitized signal. Other characteristics may be associated with particular patterns recognized in the digitized signal. The patterns may similarly be associated with one or more of a frequency, phase, length, and amplitude of the digitized signal. Modulations, encoded data, Doppler effects, and geolocation/direction finding characteristics can be extracted from the digitized signal. Other signal characteristics may be related to the type of emitter that generated the signal, or a distance to the emitter. Still other signal characteristics may be related to environmental conditions around DRFM 102.

According to some embodiments, transform circuit 212 applies a transform to the digitized signal based on the determined one or more characteristics. For example, the digitized signal may be stacked upon itself or upon other waveforms with control over the phase of each of the stacked waveforms. The ability to stack coherent signals and produce a coherent combined signal via individual phase control can have many advantages such as control over orthogonal RF properties or control over the amplification or cancellation of RF energy. In another example, the digitized signal may be combined with a particular arbitrary spread-spectrum sequence or may be encoded with coherent phase and frequency properties to produce the coherent attack signal. In yet another example, transform circuit 212 may add one or more amplitude peaks and/or signal drops anywhere within the bandwidth of the digitized signal. In some embodiments, the time duration of the digitized signal increases after applying the transform. As discussed above, the transform may involve stacking copies of the digitized waveform and modulating one or more of the stacked copies.

Any one or more of the described transforms may be applied to the digitized signal by transform circuit 212 based on the signal characteristics that provide information about, for example, the surrounding environment and/or the emitter of the signal. The transforms may be applied to exhibit certain effects and/or counteract various environmental behaviors. For example, if DRFM 102 is configured to provide attack signals that match the coherency of an emitter, phase transforms may be applied to account for free space path loss. In another example, if it is desirable for the generated attack signal to demonstrate a Doppler effect, transform circuit 212 may apply a frequency shift or a linear frequency modification to counteract or exacerbate motion of DRFM 102. The decision on whether to apply one or more transforms to the data might be made real-time by transform circuit 212 based on the determined signal characteristics or a priori depending on the circumstance.

In some embodiments, an incoming digitized signal bypasses transform circuit 212, or passes through transform circuit 212 without being transformed. In such situations, a received RF signal is merely delayed by a given duration before being transmitted back out.

The transform applied to the digitized signal by transform circuit 212 may generate a plurality of pulses having a choreographed pattern that is based at least in part on the one or more characteristics. For example, a pseudo-random Doppler shift may be enabled across the bandwidth of the digitized signal.

The modulated signal may be stored in a memory 214 before it is to be transmitted back to the originating source. Memory 214 may represent the same memory device as memory 210 or may be a separate memory device. Memory 214 may be any of the same memory types discussed above for memory 210. In some embodiments, memory 214 has a FIFO architecture to queue up attack response signals before they are sent back out. In some embodiments, memory 214 provides long-term storage of the generated attack signals such that they may be viewed at a later time.

According to some embodiments, a pulse processor 222 provides pulse characteristics for the received RF energy, including but not limited to, pulse width, frequency, amplitude, modulation type, and signal to noise ratio (SNR). The extracted pulse characteristics may be used by transform circuit 212 when determining a transform to apply to the digitized signal.

Antenna tracker 224 may be used to provide an azimuth estimate of where a received RF signal originated from. For example, the received RF signal may be generated from a spinning emitter such as a RADAR. By determining the general direction of the signal source, DRFM 102 may transmit the generated attack signal back towards the signal source or maximize a power output of the transmitted signal in the direction of the signal source.

According to some embodiments, a pulse tracker 226 correlates many similar received pulses and determines whether they originated from the same signal source. The correlation may involve comparing one or more characteristics of the receives pulses, such as amplitude, frequency, phase, and waveform shape. According to some embodiments, a technique scheduler 228 determines at what time the transmitted attack signal should be triggered to provide accurate, coherent signal transmissions. In some examples, technique scheduler 228 uses information determined from pulse tracker 226 regarding how many pulses are transmitted for a given period of time to align the transmission of pulses back towards the signal source. In some embodiments, technique scheduler 228 adapts one or more delay times provided to various signal pulses over a given time window, such as over 10's of seconds. Technique scheduler 228 may set a delay time for a given received RF signal based on the determined one or more characteristics about the digitized signal. The delay times provide a delay between receiving the signal and transmitting the signal. For example, in situations where no transform is to occur, the received digitized signal may remain in memory 210 or memory 214 for the given delay period before it is passed on to DAC 216 and transmitted out. In other examples where the digitized signal is transformed using transform circuit 212, the transformed digitized signal remains in memory 214 for the given delay period before it is passed on to DAC 216 and transmitted out.

The transformed digitized signal (that may include one or more signal pulses) is converted back to an analog signal using digital-to-analog converter (DAC) 216, according to some embodiments. DAC 216 may be any standard or known DAC component. In some other embodiments, DAC 216 is omitted from DRFM 102 or bypassed when digital signals are received by receiver 202.

The analog attack signal may be mixed with an oscillating carrier frequency at a mixer 218. The oscillating carrier frequency may be generated from local oscillator 206, or from any other oscillating source. The attack signal may then be transmitted, using transmitter 220, back towards the originating source of the received RF signal. In some embodiments, the transmitted attack signal and the received RF signal are coherent such that the originating source is more likely to trust the received attack signal. In some embodiments receiver 202 and transmitter 220 are integrated into the same transceiver component.

Figure 3:
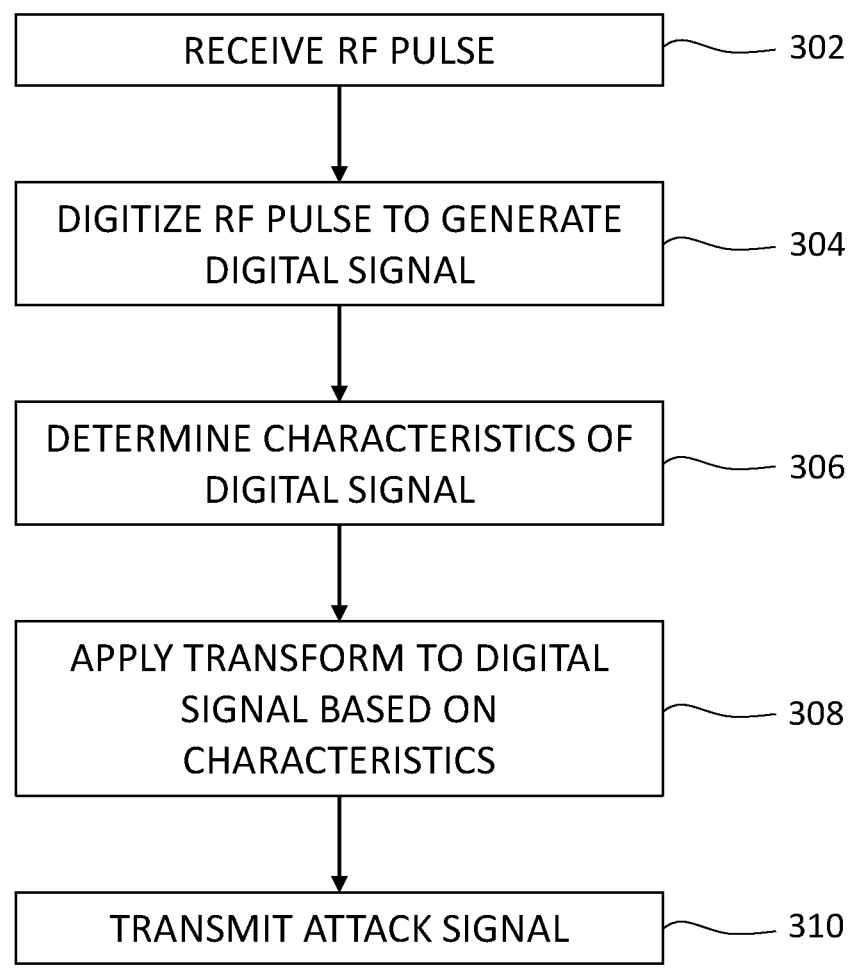
FIG. 3 is a flowchart illustrating a methodology for transforming a received signal into an attack signal, in accordance with certain embodiments of the present disclosure.

FIG. 3 is a flowchart illustrating an example method 300 for producing an attack signal based on a particular received signal, in accordance with certain embodiments of the present disclosure. As can be seen, the example method includes a number of phases and sub-processes, the sequence of which may vary from one embodiment to another. However, when considered in the aggregate, these phases and sub-processes form a process for synthesizing an attack signal in accordance with certain of the embodiments disclosed herein. These embodiments can be implemented, for example using the system architecture illustrated in FIG. 2 as described above. However other system architectures can be used in other embodiments, as will be apparent in light of this disclosure. To this end, the correlation of the various functions shown in FIG. 2 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 300. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

Method 300 may begin at operation 302 where one or more RF pulses (e.g., an RF signal) is received. The RF signal may be received from a receiver or transceiver structure. The RF signal may be transmitted from an enemy radiating source that is using the RF signal to probe for information about a particular area or to communicate with another system. Thus, the RF signal is intercepted by, for example, a DRFM in accordance with some embodiments described herein.

Method 300 continues with operation 304 where the received RF signal is digitized. The RF signal may be digitized using a standard ADC component. In some embodiments, operation 304 is skipped if the received signal is already a digital signal.

Method 300 continues with operation 306 where one or more characteristics of the digital signal are determined. These characteristics may include one or more of a frequency, phase, and amplitude of the digitized signal. Other characteristics may be associated with particular patterns recognized in the digitized signal. The patterns may similarly be associated with one or more of a frequency, phase, and amplitude of the digitized signal.

Method 300 continues with operation 308 where a transform is applied to the digital signal to generate an attack signal based at least on the one or more characteristics. For example, the digitized signal may be stacked upon itself or upon other waveforms with control over the phase of each of the stacked waveforms. The ability to stack coherent signals and produce a coherent combined attack signal via individual phase control can have many advantages such as control over orthogonal RF properties or control over the amplification or cancellation of RF energy. In another example, the digitized signal may be combined with a particular arbitrary spread-spectrum sequence or may be encoded with coherent phase and frequency properties to produce the coherent attack signal. In yet another example, one or more amplitude peaks and/or signal drops may be added anywhere within the bandwidth of the digital signal. The applied transform applied may generate a plurality of pulses having a choreographed pattern that is based at least in part on the one or more characteristics. For example, a pseudo-random Doppler shift may be enabled across the bandwidth of the digital signal.

Method 300 continues with operation 310 where the attack signal is transmitted back towards the signal source that originally sent the received RF signal. According to some embodiments, the attack signal and the received RF signal are coherent. The attack signal may be specifically tailored by the applied transform such that it provides deliberate false information back to whatever source receives it.

Example System

Figure 4:
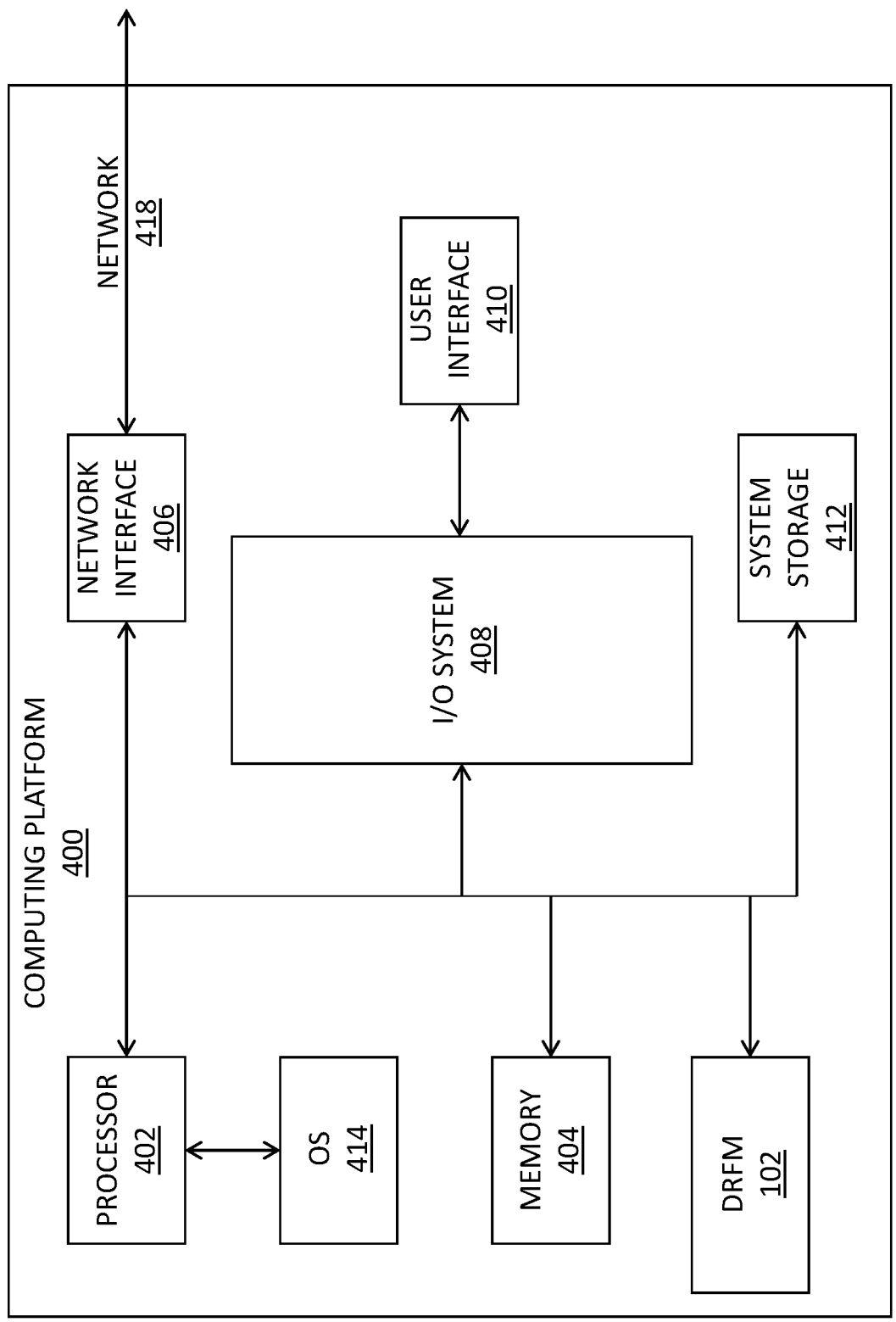
FIG. 4 is a block diagram schematically illustrating a computing platform configured to perform signal transformation, in accordance with certain embodiments of the present disclosure.

FIG. 4 illustrates an example computing platform 400 that interfaces with DRFM 102, configured in accordance with certain embodiments of the present disclosure. In some embodiments, computing platform 400 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments.

In some embodiments, computing platform 400 may comprise any combination of a processor 402, a memory 404, DRFM 102, a network interface 406, an input/output (I/O) system 408, a user interface 410, and a storage system 412. As can be further seen, a bus and/or interconnect is also provided to allow for communication between the various components listed above and/or other components not shown. Computing platform 400 can be coupled to a network 418 through network interface 406 to allow for communications with other computing devices, platforms, or resources. Other componentry and functionality not reflected in the block diagram of FIG. 4 will be apparent in light of this disclosure, and it will be appreciated that other embodiments are not limited to any particular hardware configuration.

Processor 402 can be any suitable processor and may include one or more coprocessors or controllers to assist in control and processing operations associated with computing platform 400. In some embodiments, processor 402 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. In some embodiments, processor 402 includes transform circuit 212.

Memory 404 can be implemented using any suitable type of digital storage including, for example, flash memory and/or random access memory (RAM). In some embodiments, memory 404 may include various layers of memory hierarchy and/or memory caches as are known to those of skill in the art. Memory 404 may be implemented as a volatile memory device such as, but not limited to, a RAM, dynamic RAM (DRAM), block RAM (BRAM), or static RAM (SRAM) device. Storage system 412 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 412 may comprise technology to increase the storage performance enhanced protection for valuable digital media when multiple hard drives are included.

Processor 402 may be configured to execute an Operating System (OS) 414 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing platform 400, and therefore may also be implemented using any suitable existing or subsequently-developed platform.

Network interface 406 can be any appropriate network chip or chipset which allows for wired and/or wireless connection between other components of computing platform 400 and/or network 418, thereby enabling computing platform 400 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 408 may be configured to interface between various I/O devices and other components of computing platform 400. I/O devices may include, but not be limited to, a user interface 410. User interface 410 may include devices (not shown) such as a display element, touchpad, keyboard, mouse, and speaker, etc. I/O system 408 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 402 or any chipset of computing platform 400. In some embodiments, I/O system 408 also receives instructions, via user interface 410, regarding one or more transforms to apply to a received signal at DRFM 102 in order to generate a particular attack signal.

It will be appreciated that in some embodiments, the various components of the computing platform 400 may be combined or integrated in a system-on-a-chip (SoC) architecture. In some embodiments, the components may be hardware components, firmware components, software components or any suitable combination of hardware, firmware or software.

In various embodiments, computing platform 400 may be implemented as a wireless system, a wired system, or a combination of both. When implemented as a wireless system, computing platform 400 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 400 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the signal transform methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In certain embodiments, the system may leverage processing resources provided by a remote computer system accessible via network 418. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments computing platform 400 may comprise additional, fewer, or alternative subcomponents as compared to those included in the example embodiment of FIG. 4.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a programmable radio frequency (RF) memory system that includes a receiver configured to receive an RF pulse; a memory configured to store a digitized version of the RF pulse; a waveform transform module; and a transmitter. The waveform transform module determines one or more characteristics of the digitized version of the RF pulse, and based on the determined one or more characteristics, transforms the digitized version of the RF pulse into a transformed signal, the transformed signal having at least one characteristic that is different than the one or more characteristics. The transmitter is designed to transmit an analog equivalent of the transformed signal, wherein the analog equivalent of the transformed signal and the received RF pulse are coherent.

Example 2 includes the subject matter of Example 1, wherein the receiver and the transmitter are provided together in a single transceiver module.

Example 3 includes the subject matter of Example 1 or 2, further comprising an analog to digital converter (ADC) configured to generate the digitized version of the RF pulse and a digital to analog converter (DAC) configured to generate the analog equivalent of the transformed signal.

Example 4 includes the subject matter of any one of Examples 1-3, wherein the one or more characteristics comprises a frequency, phase, length or amplitude.

Example 5 includes the subject matter of any one of Examples 1-4, wherein the waveform transform module is configured to transform the digitized version of the RF pulse by changing one or more of a frequency, phase, or amplitude of the digitized version of the RF pulse.

Example 6 includes the subject matter of any one of Examples 1-5, wherein the waveform transform module is configured to transform the digitized version of the RF pulse by adding an amplitude peak or a signal drop within a bandwidth of the digitized version of the RF pulse.

Example 7 includes the subject matter of any one of Examples 1-6, wherein the waveform transform module is further configured to transform the digitized version of the RF pulse into a plurality of transformed pulses having a pattern based at least in part on at least one of the one or more characteristics.

Example 8 includes the subject matter of Example 7, wherein the pattern comprises a pseudo-random Doppler shift to the digitized version of the RF pulse.

Example 9 includes the subject matter of any one of Examples 1-8, wherein the waveform transform module is configured to transform the digitized version of the RF pulse by copying the digitized version of the RF pulse to create one or more copies of the digitized version of the RF pulse, adjusting a phase of one or more of the one or more copies of the digitized version of the RF pulse, and stacking the one or more copies of the digitized version of the RF pulse upon each other to generate the transformed signal.

Example 10 is a method of transformed a signal. The method includes receiving an RF pulse; digitizing the received RF pulse to generate a digital signal; determining one or more characteristics of the digital signal; applying a transform to the digital signal to generate a transformed signal, wherein the transform is based at least partially on one or more of the one or more characteristics; and transmitting an analog equivalent of the transformed signal.

Example 11 includes the subject matter of Example 10, wherein the receiving and the transmitting are performed by a same transceiver component.

Example 12 includes the subject matter of Example 10 or 11, further comprising storing the digital signal in a memory.

Example 13 includes the subject matter of any one of Examples 10-12, further comprising storing the transformed signal in a memory.

Example 14 includes the subject matter of any one of Examples 10-13, further comprising generating a plurality of transformed signals based on the transform applied to the digital signal.

Example 15 includes the subject matter of Example 14, further comprising determining a pattern of the plurality of transformed signals, wherein the pattern is based at least partially on at least one of the one or more characteristics.

Example 16 includes the subject matter of Example 15, wherein the pattern comprises a pseudo-random Doppler shift to the digital signal.

Example 17 includes the subject matter of any one of Examples 10-16, wherein applying the transform to the digital signal comprises copying the digital signal to create one or more copies of the digital signal, adjusting a phase of one or more of the one or more copies of the digital signal, and stacking the one or more copies of the digital signal upon each other to generate the transformed signal.

Example 18 includes the subject matter of any one of Examples 10-17, wherein applying a transform comprises modulating one or more of a frequency, phase, length or amplitude of the digital signal.

Example 19 includes the subject matter of any one of Examples 10-18, wherein applying a transform comprises adding an amplitude peak or a signal drop within a bandwidth of the digital signal.

Example 20 is a computer program product including one or more non-transitory machine-readable mediums having operations encoded thereon that, when executed by one or more processors, result in a transform being applied to a received signal, the operations comprising determining one or more characteristics of the received signal, and applying a transform to the received signal to generate a transformed signal, wherein the transform is based at least partially on one or more of the one or more characteristics.

Example 21 includes the subject matter of Example 20, wherein the operations further comprise generating a plurality of transformed signals based on the transform applied to the received signal.

Example 22 includes the subject matter of Example 21, wherein the operations further comprise determining a pattern of the plurality of transformed signals, wherein the pattern is based at least partially on at least one of the one or more characteristics.

Example 23 includes the subject matter of Example 22, wherein the pattern comprises a pseudo-random Doppler shift to the plurality of transformed signals.

Example 24 includes the subject matter of any one of Examples 20-23, wherein applying the transform to the received signal comprises copying the received signal to create one or more copies of the received signal, adjusting a phase of one or more of the one or more copies of the received signal, and stacking the one or more copies of the received signal upon each other to generate the transformed signal.

Example 25 includes the subject matter of any one of Examples 20-24, wherein applying a transform comprises modulating one or more of a frequency, phase, length or amplitude of the received signal.

Example 26 includes the subject matter of any one of Examples 20-25, wherein applying a transform comprises adding an amplitude peak or a signal drop within a bandwidth of the received signal.

What is claimed is:

1. A programmable radio frequency (RF) memory system, comprising:
   a receiver configured to receive an RF pulse;
   a memory configured to store a digitized version of the RF pulse;
   a waveform transform module configured to
   determine one or more characteristics of the digitized version of the RF pulse, and
   based on the determined one or more characteristics, transform the digitized version of the RF pulse into a transformed signal, the transformed signal having at least one characteristic that is different than the one or more characteristics; wherein the digitized version of the RF pulse is transformed by:
      copying the digitized version of the RF pulse to create one or more copies of the digitized version of the RF pulse,
      adjusting a phase of one or more of the one or more copies of the digitized version of the RF pulse, and
      stacking the one or more copies of the digitized version of the RF pulse upon each other to generate the transformed signal; and
   a transmitter configured to transmit an analog equivalent of the transformed signal, wherein the analog equivalent of the transformed signal and the received RF pulse are coherent.

2. The programmable RF memory system of claim 1, wherein the receiver and the transmitter are provided together in a single transceiver module.

3. The programmable RF memory system of claim 1, further comprising an analog to digital converter (ADC) configured to generate the digitized version of the RF pulse and a digital to analog converter (DAC) configured to generate the analog equivalent of the transformed signal.

4. The programmable RF memory system of claim 1, wherein the one or more characteristics comprises a frequency, phase, length or amplitude.

5. The programmable RF memory system of claim 1, wherein the waveform transform module is configured to transform the digitized version of the RF pulse by changing one or more of a frequency, phase, or amplitude of the digitized version of the RF pulse.

6. The programmable RF memory system of claim 1, wherein the waveform transform module is configured to transform the digitized version of the RF pulse by adding an amplitude peak or a signal drop within a bandwidth of the digitized version of the RF pulse.

7. The programmable RF memory system of claim 1, wherein the waveform transform module is further configured to transform the digitized version of the RF pulse into a plurality of transformed pulses having a pattern based at least in part on at least one of the one or more characteristics.

8. The programmable RF memory system of claim 7, wherein the pattern comprises a pseudo-random Doppler shift to the digitized version of the RF pulse.

9. A method of transforming a signal, comprising:
   receiving an RF pulse;
   digitizing the received RF pulse to generate a digital signal;
   determining one or more characteristics of the digital signal;
   applying a transform to the digital signal to generate a transformed signal by:
      copying the digital signal to create one or more copies of the digital signal,
      adjusting a phase of one or more of the one or more copies of the digital signal, and
      stacking the one or more copies of the digital signal upon each other to generate the transformed signal;
   wherein the transform is based at least partially on one or more of the one or more characteristics; and
   transmitting an analog equivalent of the transformed signal.

10. The method of claim 9, wherein the receiving and the transmitting are performed by a same transceiver component.

11. The method of claim 9, further comprising storing the digital signal in a memory.

12. The method of claim 9, further comprising storing the transformed signal in a memory.

13. The method of claim 9, further comprising generating a plurality of transformed signals based on the transform applied to the digital signal.

14. The method of claim 13, further comprising determining a pattern of the plurality of transformed signals, wherein the pattern is based at least partially on at least one of the one or more characteristics.

15. The method of claim 14, wherein the pattern comprises a pseudo-random Doppler shift to the digital signal.

16. The method of claim 9, wherein applying a transform comprises modulating one or more of a frequency, phase, length or amplitude of the digital signal.

17. The method of claim 9, wherein applying a transform comprises adding an amplitude peak or a signal drop within a bandwidth of the digital signal.

18. A computer program product including one or more non-transitory machine-readable mediums having operations encoded thereon that, when executed by one or more processors, result in a transform being applied to a received signal, the operations comprising:
- determining one or more characteristics of the received signal; and
- applying a transform to the received signal to generate a transformed signal by:
  - copying the received signal to create one or more copies of the received signal,
  - adjusting a phase of one or more of the one or more copies of the received signal, and
  - stacking the one or more copies of the received signal upon each other to generate the transformed signal;
- wherein the transform is based at least partially on one or more of the one or more characteristics.

19. The computer program product of claim 18, wherein the operations further comprise generating a plurality of transformed signals based on the transform applied to the received signal.

20. The computer program product of claim 19, wherein the operations further comprise determining a pattern of the plurality of transformed signals, wherein the pattern is based at least partially on at least one of the one or more characteristics.

21. The computer program product of claim 20, wherein the pattern comprises a pseudo-random Doppler shift to the plurality of transformed signals.

22. The computer program product of claim 18, wherein applying a transform comprises modulating one or more of a frequency, phase, length or amplitude of the received signal.

23. The computer program product of claim 18, wherein applying a transform comprises adding an amplitude peak or a signal drop within a bandwidth of the received signal.

* * * * *